(12) United States Patent  (10) Patent No.: US 6,443,513 B1
Glance  (45) Date of Patent: *Sep. 3, 2002

(54) CUP BUMPER ABSORBER (75) Inventor: Patrick M. Glance, Plymouth, MI (US)

(73) Assignee: Concept Analysis Corporation, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,886

(22) Filed: May 18, 1999

Related U.S. Application Data (60) Provisional application No. 60/091,587, filed on Jul. 2, 1998.

(51) Int. Cl.[7] .......................... B60R 19/02; B60R 19/18
(52) U.S. Cl. .................... 293/133; 293/102; 296/146.6; 296/189; 428/35.7; 428/72; 428/73; 428/116
(58) Field of Search .......................... 428/35.7, 72, 73, 428/69, 116; 52/793.1, 630; 206/521, 522; 293/132, 107, 102, 133; 36/28, 29; 296/189, 146.6

(56) References Cited

U.S. PATENT DOCUMENTS

| 3,231,454 A | * | 1/1966 | Williams ..................... 428/178 |
|---|---|---|---|
| 3,684,235 A | * | 8/1972 | Schupbach .................... 428/73 |
| 4,029,350 A | * | 6/1977 | Goupy et al. ................ 293/133 |
| 4,460,205 A | | 7/1984 | Glance ........................ 293/120 |
| 4,601,367 A | * | 7/1986 | Bongers ..................... 293/133 |
| 4,670,995 A | * | 6/1987 | Huang ........................... 36/29 |
| 4,838,606 A | * | 6/1989 | Furubayashi et al. .... 296/146.6 |
| 4,856,833 A | | 8/1989 | Beekman ..................... 293/120 |
| 4,904,008 A | | 2/1990 | Glance ........................ 293/120 |
| 4,925,224 A | | 5/1990 | Smiszek ..................... 293/120 |
| 4,941,701 A | | 7/1990 | Loren ......................... 293/155 |
| 4,951,986 A | | 8/1990 | Hanafusa et al. ........... 293/120 |
| 4,969,680 A | * | 11/1990 | Shimoda ................. 296/146.6 |
| 5,030,501 A | * | 7/1991 | Colvin et al. ............... 428/178 |
| 5,150,935 A | | 9/1992 | Glance et al. .............. 293/136 |
| 5,282,288 A | * | 2/1994 | Henson ......................... 36/28 |
| 5,399,406 A | * | 3/1995 | Matsuo et al. .............. 428/178 |
| 5,431,463 A | * | 7/1995 | Chou ......................... 293/133 |
| 5,493,791 A | * | 2/1996 | Kramer ......................... 36/28 |
| 5,518,802 A | * | 5/1996 | Colvin et al. ............... 428/178 |
| 5,595,003 A | * | 1/1997 | Snow ............................. 36/28 |
| 5,731,062 A | * | 3/1998 | Kim et al. .................. 428/178 |
| 5,732,801 A | * | 3/1998 | Gertz ......................... 293/133 |
| 5,799,991 A | | 9/1998 | Glance ........................ 293/121 |

* cited by examiner

Primary Examiner—Rena L. Dye
(74) Attorney, Agent, or Firm—Waters & Morse, P.C.

(57) ABSTRACT

An energy absorbing device is formed of natural or synthetic resin material or composite material, wherein energy absorption is provided by a plurality of cup-shaped cells having a thin-walled construction with a circular cross section. The absorber is useful for automotive bumper impact and also for other applications, including automotive padding and general cushion applications.

35 Claims, 9 Drawing Sheets

CUP BUMPER ABSORBER

CROSS-REFERENCE TO RELATED APPLICATION

This application is based on provisional patent application which has been assigned U.S. Ser. No. 60/091,587 (filed Jul. 2, 1998).

BACKGROUND OF THE INVENTION

The invention relates to an elastomeric energy absorbing device comprised of cup shaped absorbers, which is particularly desirable for vehicle bumper applications but also can be used for other energy absorbing applications.

Resilient, natural and synthetic resins are used for a number of energy management purposes. Such devices are used in automobile bumper assemblies, for example, and in various other applications requiring energy absorption. An object of the present invention is to provide an improved, lightweight, inexpensive energy absorber with a low ratio of weight to crush force output.

BRIEF SUMMARY OF THE INVENTION

The present invention comprises an energy absorbing device formed of natural or synthetic resin material or composite material, wherein energy absorption is provided by a plurality of cup-shaped cells having a thin-walled construction with a circular cross section. The absorber is useful for automotive bumper impact and also for other applications, including automotive padding and general cushion applications.

These and other features, objects, and benefits of the invention will be recognized by one having ordinary skill in the art and by those who practice the invention, from the specification, the claims, and the drawing figures.

DETAILED DESCRIPTION OF PREFERRED EMBODIMENT

Figures 1, 2, 3:
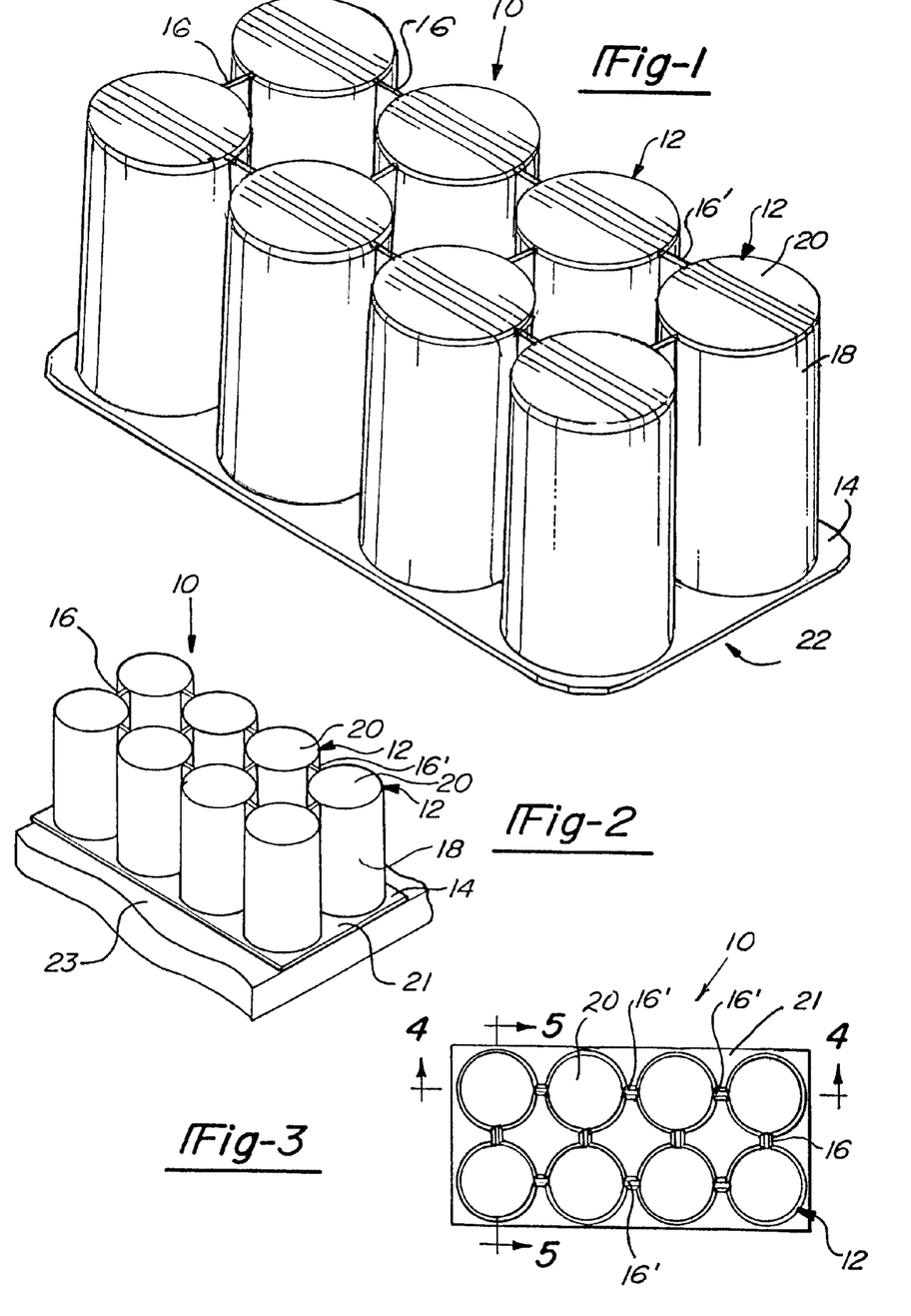
FIG. 1 is a perspective view of a cup absorber of the present invention.
FIG. 2 is a similar view of the same cup absorber formed of an injection molded high density, polyethylene alloy.
FIG. 3 is a front view of the cup absorber of FIG. 2.
Figures 4, 5:
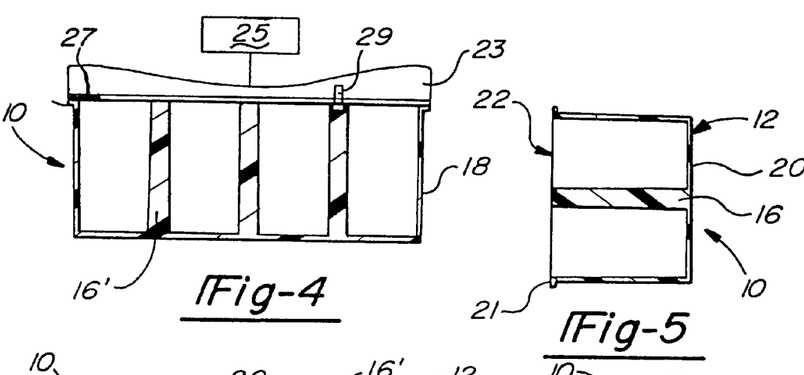
FIG. 4 is a cross-sectional view taken along lines 4—4 of FIG. 3.
FIG. 5 is a cross-sectional view taken along lines 5—5 of FIG. 3.
Figures 6, 7:
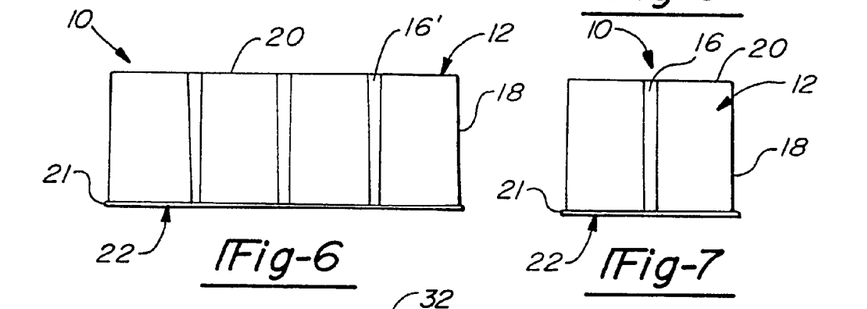
FIG. 6 is a side elevation view of the cup absorber of FIG. 3.
FIG. 7 is an end view of the cup absorber of FIG. 3.
Figure 8:
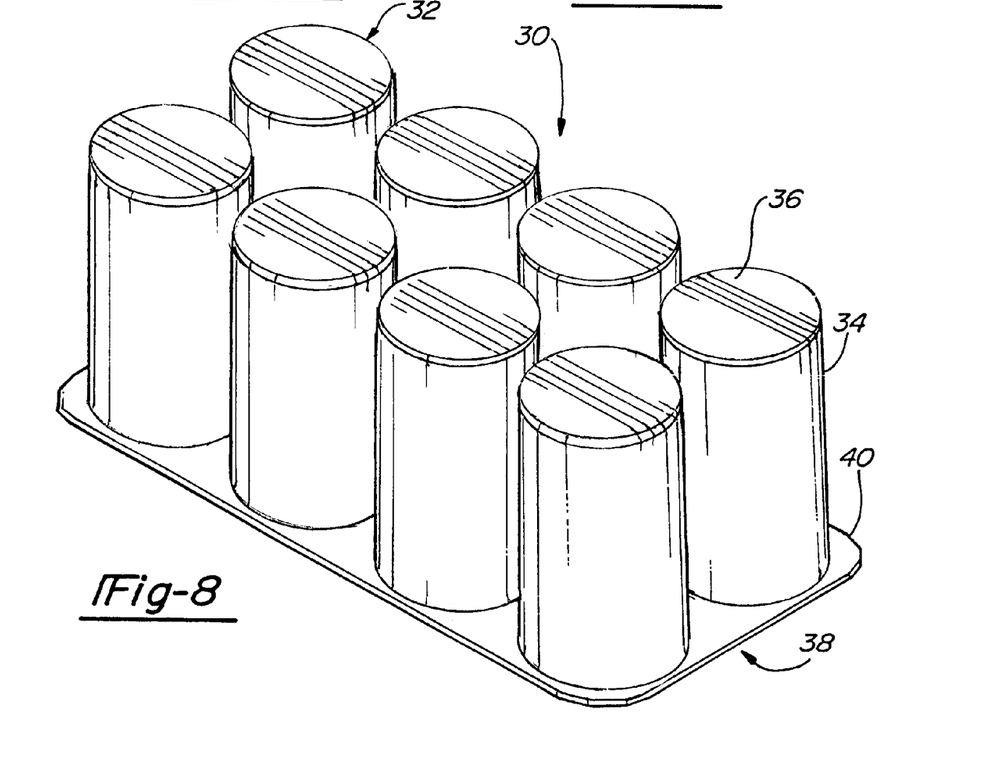
FIG. 8 is a perspective view of a bumper absorber module having eight cells formed by vacuum forming or thermoforming.
Figures 9, 10, 11, 12, 13, 14:
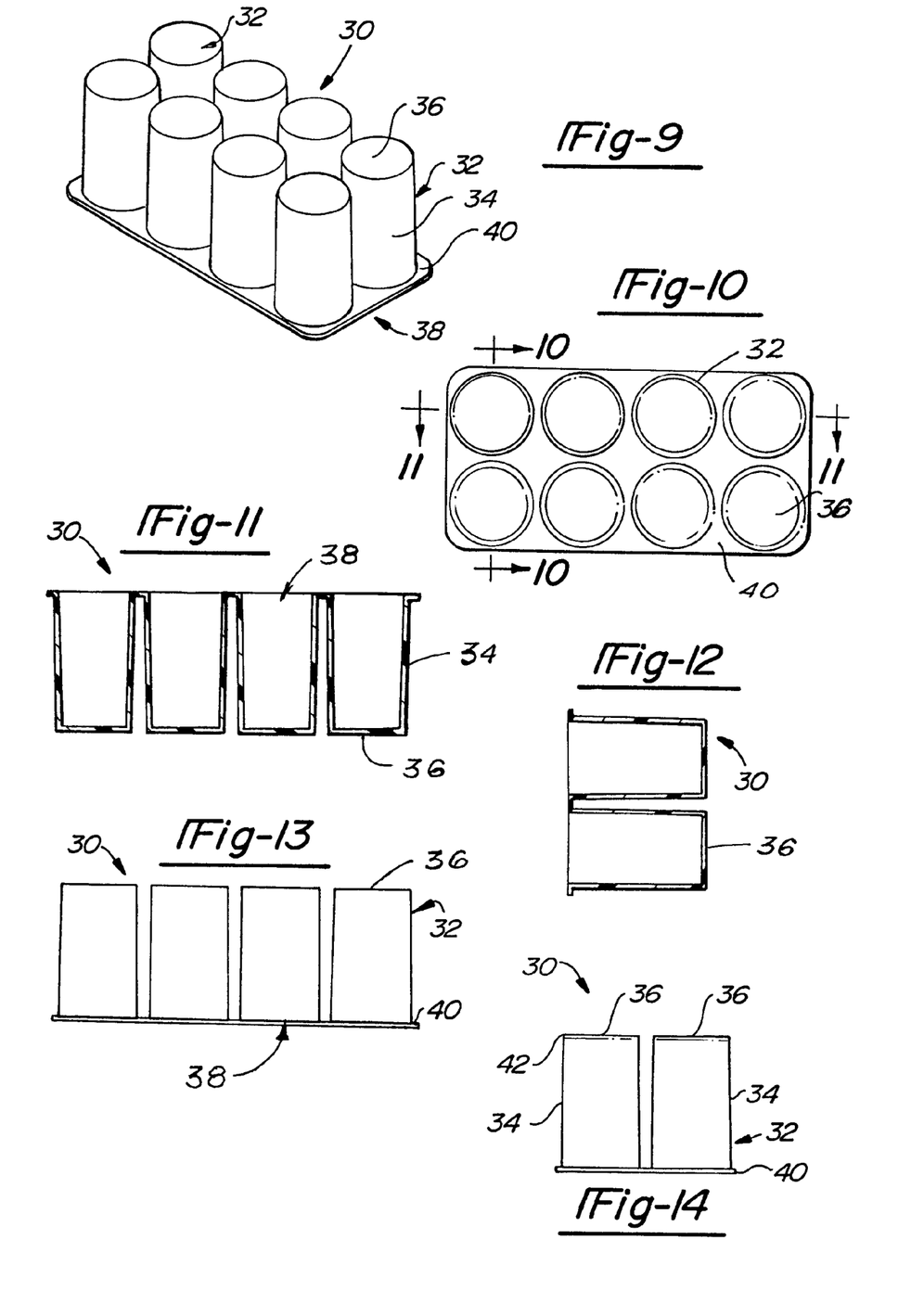
FIGS. 9–14 show the bumper absorber of FIG. 8 with view corresponding to FIGS. 2–7 which show an injection molded bumper absorber module of eight cells.
Figure 15:
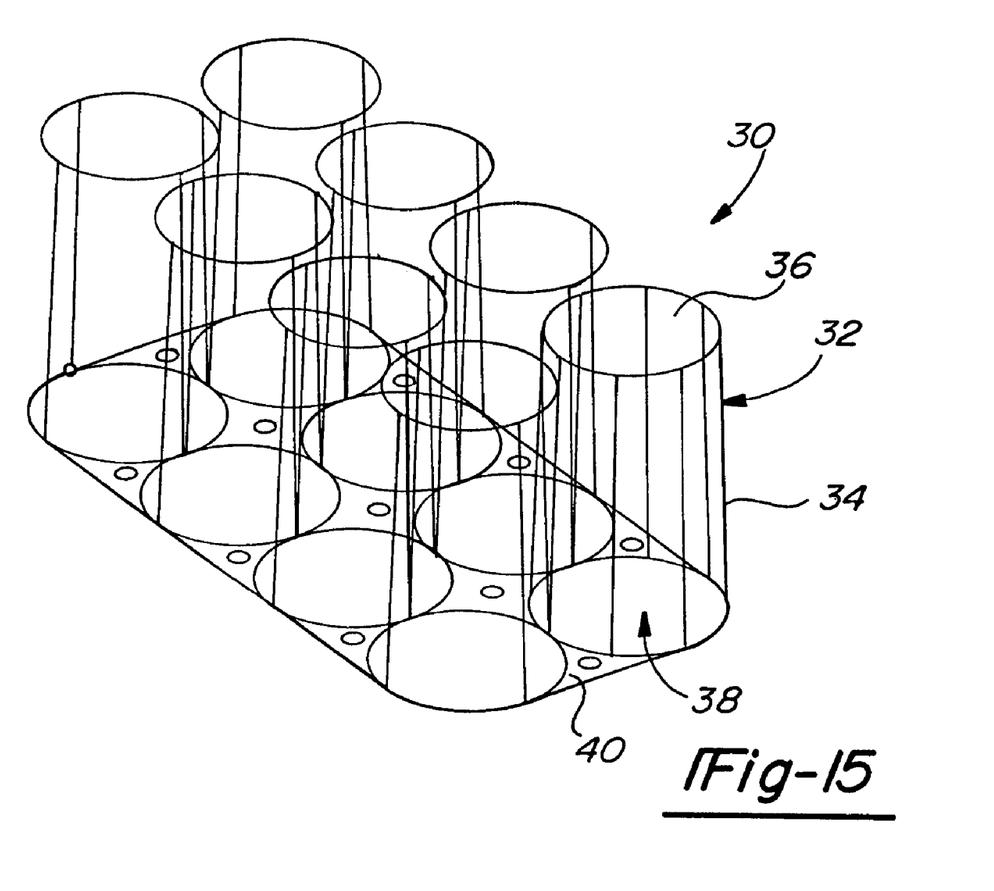
FIG. 15 is a line drawing perspective view of an eight absorber module molded on a common flat sheet base.

Referring to the drawings and more particularly to FIG. 1, an absorber 10 comprises a series of individual cup-shaped cells 12 mounted on a flat sheet 14 and interconnected by ribs 16 and 16'. The cups have side walls 18 formed with a circular cross section, a top end 20, and an open bottom end 22. Thus, each cell forms an inverted cup.

One method of forming a cup absorber of the present invention is by injection molding, as shown in FIGS. 1–7. Preferably the molded product is formed from a composite material which is a plastic elastomer, further preferably from the polyolefin family of resin materials. Injection molded high density polyethylene (HDPE) with a rubber modifier is the preferred material used in the process. However, other materials and manufacturing processes are feasible and are within the scope of the present invention.

The shape of the individual cells or cups provides an extremely efficient construction in comparison with prior energy absorbing structures. In the preferred practice of the present invention, the aspect ratio of the cup (the relationship between the height, width and wall thickness) permits efficient energy management, high force output and large compression in comparison to other devices and other designs. One exemplary cup cell size that appears to function well for a 5 mph bumper impact is 58 mm high, 32 mm in diameter and has a 1 mm wall thickness. A molded HDPE cell of the described size will weigh only 0.01 lbs., yet will produce approximately 200 lbs. resistance to axial compression. This is a ratio of 1/2000 in weight to crush force output.

Figure 22:
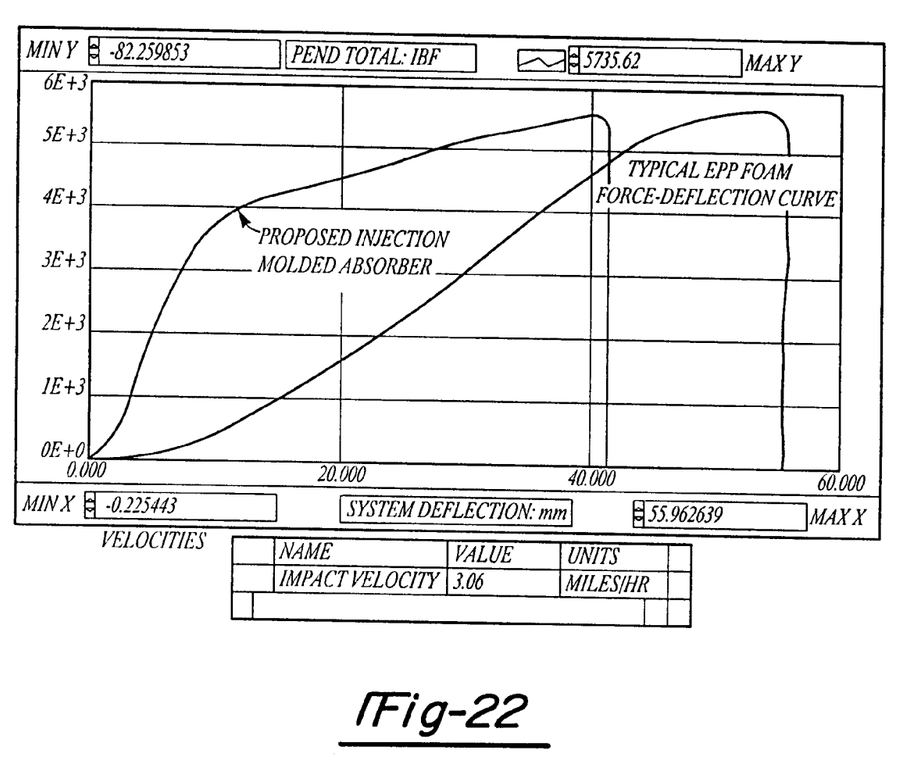
FIG. 22 is a chart showing a comparison of force-deflection curves of an EPP foam absorber and a proposed molded inverted cup absorber.
Figure 23:
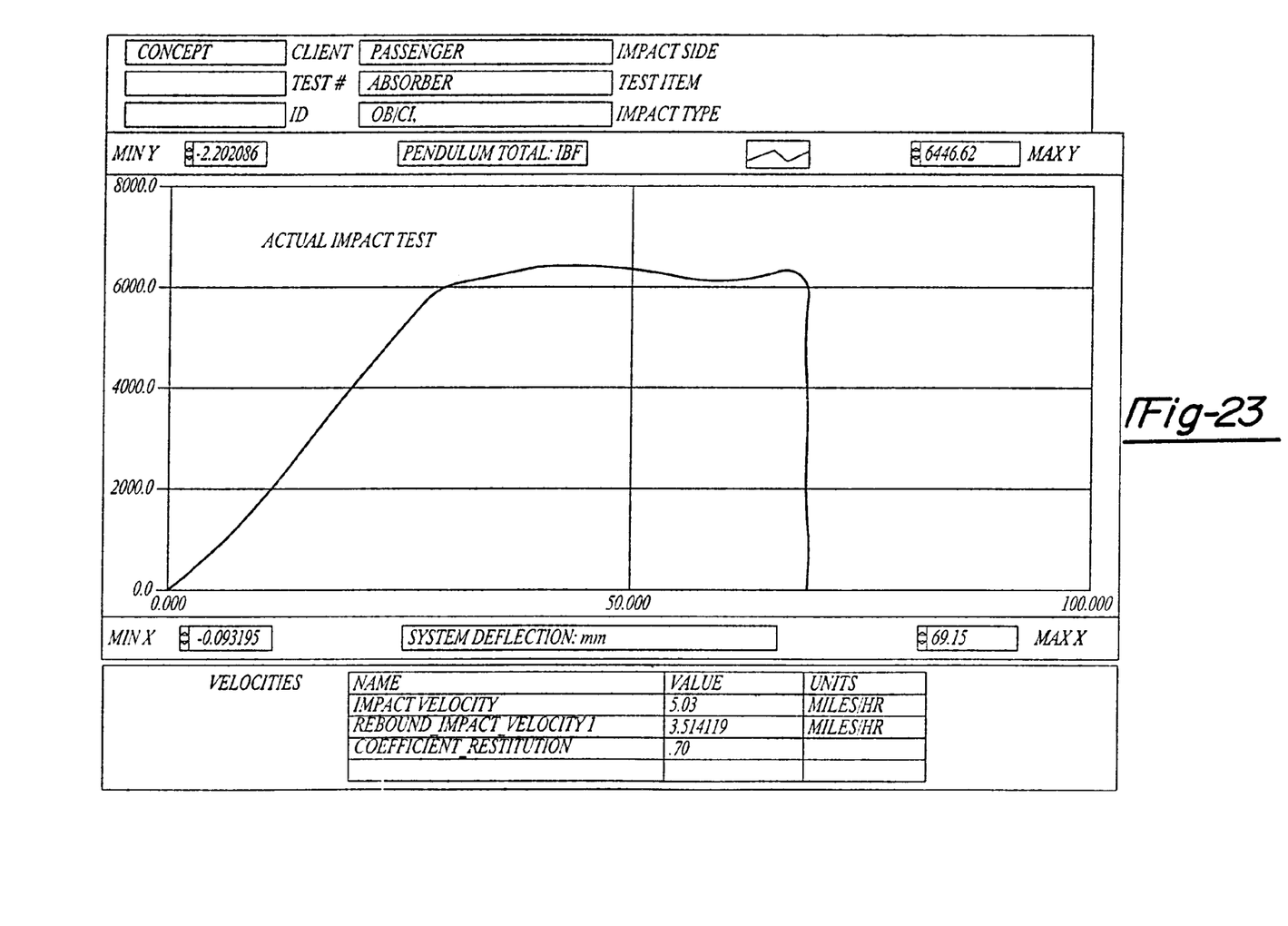
FIG. 23 is a chart showing an actual impact test of a cup absorber formed in accordance with the present invention.

The 1 mm wall thickness allows fast molding cycle, low piece cost, and high percentage of cell collapse. A 58 mm cell folds approximately four times on itself to allow a total of 50 mm of collapse with 90–100% return after impact, depending on resin material selected. FIG. 22 is a chart showing a force-deflection curve of a cell of the present invention compared with a typical EPP foam force-deflection curve. It can be seen that the present invention absorbs approximately the same energy as a foam absorber but the cup absorber has a higher efficiency and a lower deflection.

The cup absorber of the present invention typically produces 70% of a square wave energy curve, which is commercially advantageous in reducing bumper stroke and therefore reducing vehicle overhang length.

Other cell sizes can be used to vary the stiffness characterstics of the cell. The cells can be one-half or double the cell height of the exemplary cell that is 58 mm high. The other dimensions of the cell (width and wall thickness) are changed accordingly so as to maintain substantially the same aspect ratio between height, width and wall thickness (which is calculated to be about 1.8 for a cell 58 mm high, 32 mm wide and 1 mm wall thickness).

Where space limitations for a vehicle component require a low height cell, the cell size can be approximately 10–20 millimeters high, approximately 18 millimeters wide, and approximately 0.75 mm wall thickness, or a cell size having substantially the same aspect ratio of height, width, and wall thickness.

In the present invention, the multiple cells are positioned strategically, as desired, in order to absorb and manage the energy of an automotive bumper impact. In the exemplary embodiment, the base sheet 21 is used to secure the absorber 10 to a conventional component 23 of a motor vehicle 25 (both shown schematically in FIG. 4). Such securement is most typically carried out with adhesive 27 or conventional plastic push pin/mechanical fasteners 29 (both shown schematically in FIG. 4). Because each cell acts somewhat independently, the cell can be placed as desired for specific absorber applications. This makes it possible to use the absorber for many energy managing applications, including interior automotive padding and general cushion applications as well as bumper applications.

Because of the thin walled construction of the present invention, an effective absorber requires only a minimum amount of material. This translates into a low cost and a low mass absorber.

As stated above, the cup absorber can be molded from a composite material by injection molding. A second good manufacturing process is high speed vacuum forming or thermoforming, which permits the use of an extrusion grade of HDPE sheet, which will have better material properties than injection molding polyethylene. Molding from a sheet, on the other hand, has the disadvantage of limiting thickness in design control and connecting the cells.

The construction of an eight cell module of a bumper absorber 30 using a vacuum forming or thermoforming process is shown in FIGS. 8–15. Individual cells 32 are substantially similar to injection molded cells, in that the cells constitute inverted cups having side walls 34, a top 36, and an open bottom 38, with the cups being mounted on a flat sheet 40. One difference between the vacuum or thermoformed module and an injection molded module is that the thermoformed cups do not have ribs 16 interconnecting the cups. In addition the corners 42 of the cups between side walls 34 and top 36 have an increased radius in comparison with the construction of the injection molded product.

In both the injection molded and vacuum formed orthermoformed modules, however, the impact is absorbed by a series of inverted cups.

While a cup configuration having one closed end and one open end is preferred, the cups also could be formed by blow molding, in which case cups can be formed with both ends closed. Also, cups can be formed with both ends open with at least some of the molding techniques.

Figures 18, 19, 21:
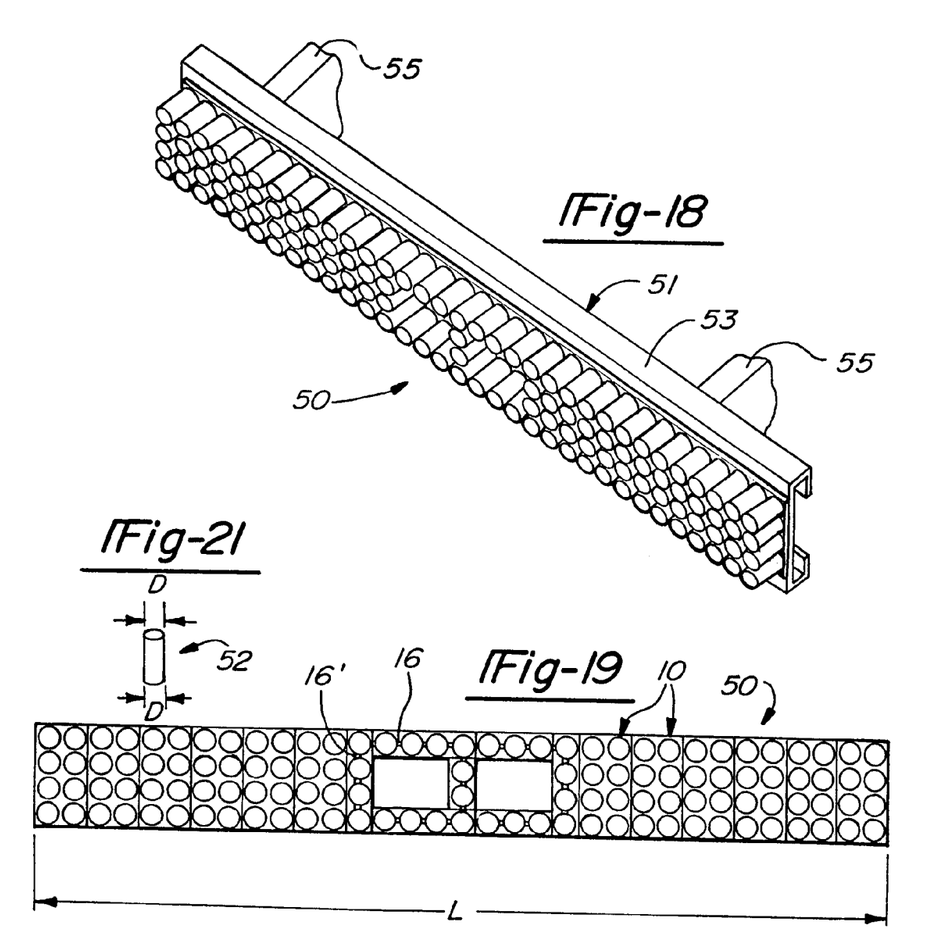
FIG. 18 is a perspective view of an absorber comprising a series of cup-shaped cells positioned side by side.
FIG. 19 is a front view of the absorber of FIG. 18.
FIG. 21 is a perspective view of a single cell in the absorber of FIGS. 18–20.
Figure 20:
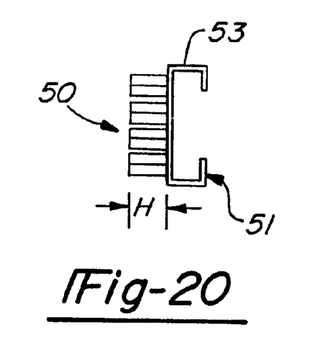
FIG. 20 is an end view of the absorber of FIG. 19.

Various cell configurations are shown in the drawings. An exemplary absorber configuration 50 that can be employed in an automobile bumper 51 is shown in FIGS. 18–20. Bumper 51 includes a conventional bumper structural reinforcement beam 53, which is mounted on conventional vehicle rails 55 (both shown schematically in FIGS. 18–20). FIG. 21 is a perspective view of a single cell 52 of the absorber configuration 50 of FIGS. 18–20. In this exemplary application, the absorber configuration has a length L of approximately 1280 mm. Each cell 52 has a height H of approximately 57.5 mm, an upper diameter d of approximately 32 mm and a lower diameter D of approximately 33 mm.

Figure 16:
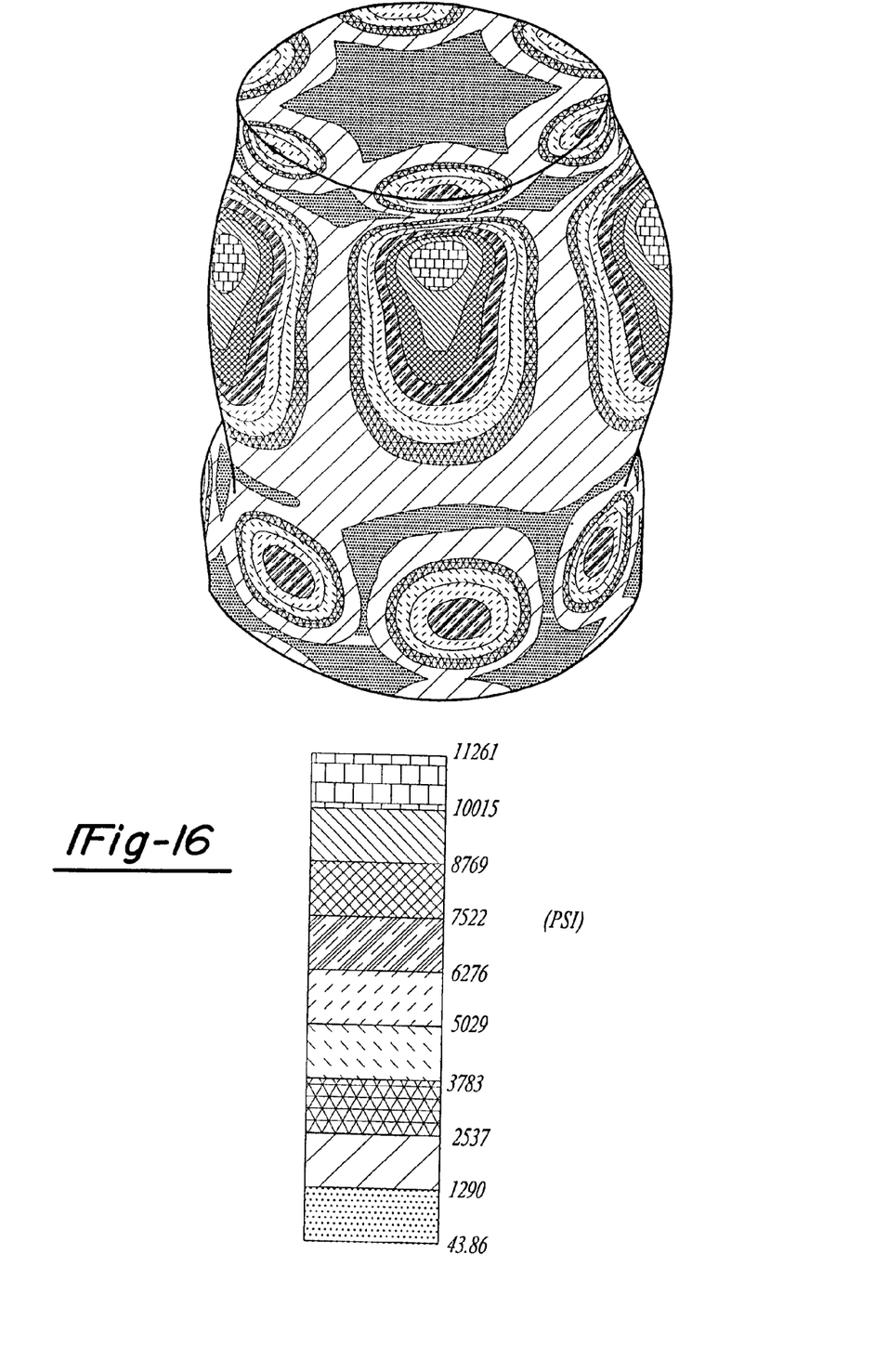
FIG. 16 is a perspective view showing a buckling analysis of a single, inverted cell.
Figure 17:
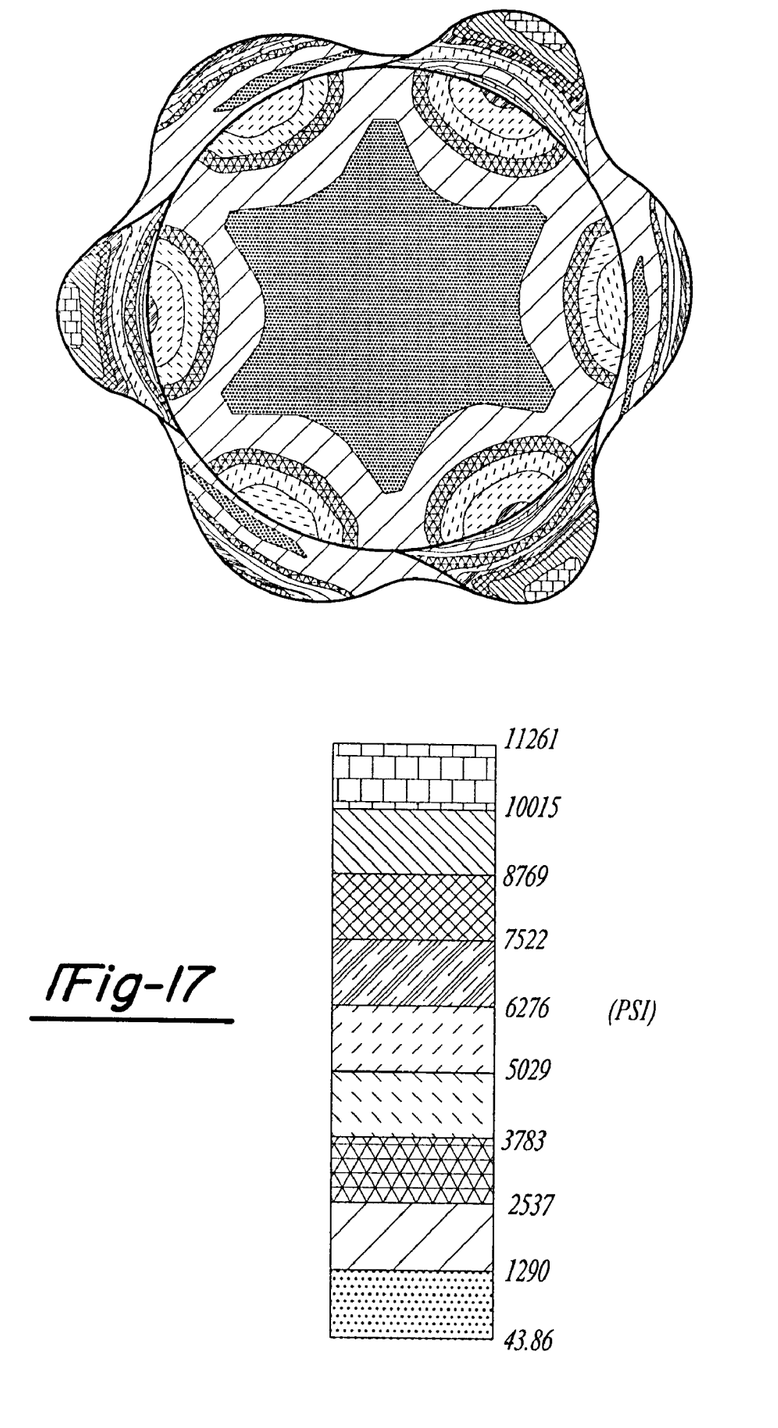
FIG. 17 is a top view of the cup of FIG. 16.

A buckling analysis of single inverted cup shaped cells is shown in FIGS. 16 and 17. The illustrations are color-coded with shading, and the scale adjacent the illustrations a stress map plotted on the compressed shape of the cell as generated from a computerized structural analysis.

Among the important features and advantages of the present invention are:

1. The aspect ratio of cell-designed parameters (ratio of wall thickness to cell height and width) provides advantageous characteristics. Other cup sizes and shapes are possible, including square, oval, rectangular and the like and are within the scope of the invention.
2. A high percentage of cell collapse by virtue of the design aspect ratio of wall thickness in comparison to cell size.
3. A high energy efficiency, approximately 70% of a square wave by virtue of its aspect ratio of design parameters.
4. Cell placement can be varied as desired. A discreet number of cells produce a known force output and can be tailored and positioned for different vehicle masses, thereby minimizing material usage.
5. Cell placement can be made to direct the majority of the bumper resistance forces at pre-designed locations, such as over the vehicle rails 55 or on center to resist pole intrusion. This is an important design feature for lowering vehicle structural mass.
6. The interconnection of individual cells by vertical ribs in the injection molded product permits horizontal multi-sweep usage. Both vertical and horizontal rib connection is possible and within the scope of the present invention. Interconnecting the cells provides lateral stability. Vertical ribs 16' are shown in addition to horizontal ribs 16 in FIGS. 2–6 and 19. The vertical and horizontal orientations refer to the rib positions in use in a motor vehicle wherein the cell axis is horizontal.
7. The horizontal connection of the individual cells by a common molded base sheet makes it possible to position an absorber module 50 over a structural bumper reinforcement beam 53 to take any sweep. This allows molding in a flat, straight shape and then attaching the module to a vehicle to form a "plan view" sweep which minimizes tooling costs.

The foregoing is representative of the preferred practice of the present invention. However, various changes in the arrangements and details of construction of the present invention may be made without departing from the spirit and scope of the present invention. It is anticipated that the teachings of the present invention may be alternatively incorporated into energy absorbing components including but not limited to trim panels, knee bolsters, and head liners.

I claim:

1. In a motor vehicle component consisting of one or more members from the group consisting of bumpers and interior components that require impact load energy absorption, the improvement comprising an impact energy absorber positioned on the vehicle component in position to receive the impact load, the impact energy absorber being integrally formed of a material comprising a resilient, moldable plastic resin and comprising a base sheet having a plurality of spaced, inverted cup-shaped energy absorbing cells integrally formed on one side thereof, the cells having a top end positioned away from the base sheet and an open bottom end in the base sheet and having a relatively thin side wall extending downwardly and outwardly between the top and the bottom, the cells having a generally circular cross-section and being resiliently collapsible in an axial direction when subjected to an axial impact load, the base sheet being positioned against the vehicle component and the cup-shaped cells extending away from the vehicle component in position to receive the impact load, the energy absorber being constructed and mounted such that the energy absorption of the energy absorber is attributable substantially exclusively to the resilient collapse of the cell side walls and not to air compression inside the cells.

2. A vehicle component according to claim 1 wherein the component is a bumper.

3. A vehicle component according to claim 2 wherein the absorber comprises cells that are approximately twice as high as they are wide.

4. A vehicle component according to claim 1, wherein the absorber comprises cells wherein the aspect ratio of cell height to width to side wall thickness is approximately the same as a cell having a height of approximately 58 mm, a width of approximately 32 mm, and a side wall thickness of approximately one millimeter.

5. A vehicle component according to claim 1 wherein the absorber comprises cells wherein the aspect ratio of the height to width to thickness of the cells is approximately 1.8.

6. A vehicle component according to claim 2 wherein the absorber comprises cells that are approximately 58 mm high, 32 mm wide at the top end, 33 mm wide at the bottom end, and one millimeter thick.

7. A vehicle component according to claim 1 wherein the absorber comprises cells wherein the cell side walls are inclined outwardly only slightly from the tops to the bottoms of the cells.

8. A vehicle component according to claim 1 wherein the diameter of the inclined cells increases from the top to the bottom of the cells by an amount approximately proportional to a diameter increase of about one millimeter over a cell height of about 58 mm.

9. A vehicle component according to claim 1 wherein the interior components are trim panels, knee bolsters, and head liners.

10. A vehicle component according to claim 9 wherein the absorber comprises cells wherein the cell height is approximately 10–20 mm, the cell width is approximately 18 mm, and the cell wall thickness is approximately 0.75 mm.

11. A vehicle component according to claim 1 wherein the energy absorber comprises a thermoplastic polyolefin resin.

12. A vehicle component according to claim 1 wherein the energy absorber comprises a material having energy absorber properties at least comparable to high density polyethylene (HDPE).

13. A vehicle component according to claim 12 wherein the material comprises high density polyethylene (HDPE).

14. A vehicle according to claim 1 wherein the energy absorber is formed by injection molding and includes reinforcing ribs that extend along and connect at least some of the cells, so as to reinforce the cells against lateral forces.

15. In a bumper for a motor vehicle having a beam with a side that is exposed to impact loads, the improvement comprising a cup bumper absorber mounted on the side in position to receive impact loads directed at the bumper, the cup bumper absorber being integrally formed of a material including a resilient, moldable plastic resin, the cup bumper absorber including a base sheet positioned against the side of the bumper beam and a plurality of cup-shaped energy absorbing cells integrally formed in the base sheet and extending away from the side of the bumper beam, the cells having a top positioned away from the base sheet, an open bottom in the base sheet, and a downwardly and outwardly tapered side wall extending between the top and bottom, the cells having a generally circular cross section and being resiliently collapsible in an axial direction when subjected to an axial impact load, the energy absorber being constructed and mounted such that the energy absorption of the energy absorber is attributable substantially exclusively to the resilient collapse of the cell side walls and not to air compression inside the cells.

16. A bumper according to claim 15 wherein the absorber further comprises one or more integral reinforcement ribs extending along and interconnecting adjacent cells, so as to reinforce the cells against non-axial loading.

17. A bumper according to claim 15 wherein the absorber comprises cup shaped cells formed such that side walls of the cells resiliently fold on themselves when collapsing under an axial impact load, the cells being formed of thin-walled construction, with the cell walls being sufficiently thin in comparison with the height and width of the cells that a cell approximately 58 millimeters high and approximately 32 millimeters wide will collapse by a high percentage of its height between its fully extended and fully collapsed conditions.

18. A bumper according to claim 17 wherein the absorber comprises cells that collapse by about 86% of their height between their fully extended and fully collapsed conditions.

19. A bumper according to claim 18 wherein the side walls of the cells are about one millimeter in thickness.

20. A bumper according to claim 15 wherein the absorber comprises cells that are oriented in generally vertical columns and generally horizontal rows, with at least some of the cells in at least one column being interconnected by ribs that extend in an axial direction between the side walls of the cells, at least some of the columns of cells having no ribs horizontally interconnecting the cells in that column with the cells in an adjacent column of cells.

21. A bumper according to claim 15 wherein the bumper comprises an elongated beam, and the absorber comprises one or more integrally formed modules that are mounted side by side along the bumper beam, each module including a plurality of cells.

22. A bumper according to claim 21 wherein the absorber modules each include no more than four cells in height.

23. A bumper according to claim 21 wherein the absorber is several times longer than it is high and extends for a substantial portion of the length of the bumper.

24. A bumper according to claim 15 wherein the absorber comprises cells that are free standing and are not interconnected by horizontal ribs.

25. A bumper according to claim 15 wherein the absorber comprises cells approximately twice as high as they are wide.

26. A bumper according to claim 15, wherein the absorber comprises cells wherein the aspect ratio of cell height to width to side wall thickness is approximately the same as a cell having a height of approximately 18 mm, a width of approximately 32 mm, and a side wall thickness of approximately one millimeter.

27. A bumper according to claim 15 wherein the absorber comprises cells wherein the aspect ratio of the height to width to side wall thickness the cells is approximately 1.8.

28. A bumper according to claim 15 wherein the absorber comprises cells about 58 mm high, 32 mm wide at the top end, 33 mm wide at the bottom end, and one millimeter thick.

29. A bumper according to claim 15 wherein the absorber comprises cells wherein the cell side walls are inclined outwardly only slightly from the tops to the bottoms of the cells.

30. A bumper according to claim 29 wherein the absorber comprises cells wherein the diameter of the inclined cells increases from the top to the bottom of the cells by an amount approximately proportional to a diameter increase of about one millimeter over a cell height of about 58 mm.

31. A bumper according to claim 15 wherein the absorber comprises cells wherein the cells have a height of about 29 mm to about 116 mm.

32. A bumper according to claim 31 wherein the absorber comprises cells wherein the side wall thickness of the cells varies between about 0.5 mm to about 2 mm, with the side wall thickness varying generally in proportion to variations in cell height.

33. A bumper according to claim 15 wherein the absorber is formed of a thermoplastic resin having a stiffness comparable to high density polyethylene and comprising cells having a height, width, and wall thickness such that the ratio of absorber weight to crush force output of the absorber is at least about 1/2000.

34. A bumper according to claim 15 wherein the absorber comprises cells that are formed such that the absorber cells have impact load energy absorbing properties at least comparable to a high density polyethylene absorber comprising cells that have a height of approximately 58 mm, a width of approximately 32 mm, and a side wall thickness of approximately 1 mm.

35. A bumper according to claim 15 wherein the absorber comprises cells wherein the cells are formed such that the walls have an energy absorber weight to crush force ratio at least comparable to cells formed of high density polyethylene having a height of approximately 58 mm, a width of approximately 32 mm, and a side wall thickness of approximately 1 mm.

* * * * *

UNITED STATES PATENT AND TRADEMARK OFFICE
CERTIFICATE OF CORRECTION

PATENT NO.    : 6,443,513 B1
DATED         : September 3, 2002
INVENTOR(S)   : Patrick M. Glance It is certified that error appears in the above-identified patent and that said Letters Patent is hereby corrected as shown below:

Column 6,
Line 51, "18" should be -- 58 --.

Signed and Sealed this

Seventh Day of January, 2003

JAMES E. ROGAN
*Director of the United States Patent and Trademark Office*